United States Patent
Xu

(10) Patent No.: US 11,943,172 B2
(45) Date of Patent: Mar. 26, 2024

(54) SIGNAL TRANSMISSION METHOD AND APPARATUS, TERMINAL AND NETWORK DEVICE

(71) Applicant: GUANGDONG OPPO MOBILE TELECOMMUNICATIONS CORP., LTD., Guangdong (CN)

(72) Inventor: Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 479 days.

(21) Appl. No.: 17/172,712

(22) Filed: Feb. 10, 2021

(65) Prior Publication Data

US 2021/0167931 A1    Jun. 3, 2021

Related U.S. Application Data

(63) Continuation of application No. PCT/CN2018/100068, filed on Aug. 10, 2018.

(51) Int. Cl.
| | |
|---|---|
| *H04L 5/00* | (2006.01) |
| *H04W 24/10* | (2009.01) |
| *H04W 72/23* | (2023.01) |

(52) U.S. Cl.
CPC .......... *H04L 5/0092* (2013.01); *H04L 5/0048* (2013.01); *H04W 24/10* (2013.01); *H04W 72/23* (2023.01); *H04W 74/0808* (2013.01)

(58) Field of Classification Search
None
See application file for complete search history.

(56) References Cited

U.S. PATENT DOCUMENTS

| | | | |
|---|---|---|---|
| 2015/0098397 A1 | 4/2015 | Damnjanovic et al. | |
| 2015/0319758 A1* | 11/2015 | Nigam | H04J 11/0083 370/329 |
| 2016/0043841 A1 | 2/2016 | Lunttila et al. | |
| 2017/0163470 A1* | 6/2017 | Seo | H04W 4/70 |
| 2017/0251456 A1 | 8/2017 | Radulescu et al. | |
| 2018/0017661 A1* | 1/2018 | Morioka | H04W 4/029 |
| 2018/0084447 A1* | 3/2018 | Seo | H04L 1/00 |
| 2018/0123859 A1 | 5/2018 | Liu et al. | |

(Continued)

FOREIGN PATENT DOCUMENTS

| | | |
|---|---|---|
| CN | 105376861 A | 3/2016 |
| CN | 108141888 A | 6/2018 |

(Continued)

OTHER PUBLICATIONS

The first Office Action of corresponding Taiwanese application No. 108128384 dated Aug. 9, 2022 and its English translation provided by foreign associates.

(Continued)

*Primary Examiner* — Duc T Duong
(74) *Attorney, Agent, or Firm* — Ladas & Parry, LLP

(57) ABSTRACT

Embodiments of the present application provide a signal transmission method and apparatus, a terminal and a network device. The method includes: receiving, by a terminal, a first indication signal, and determining, based on the first indication signal, at least one of a time domain, a frequency domain and a code domain of a measurement reference signal whose measurement result is valid.

24 Claims, 3 Drawing Sheets

A terminal receives a first indication signal, and determines, based on the first indication signal, at least one of a time domain, a frequency domain and a code domain of a measurement reference signal whose measurement result is valid — 201

(56) References Cited

U.S. PATENT DOCUMENTS

| | | | |
|---|---|---|---|
| 2018/0146389 A1* | 5/2018 | Nagata | H04B 7/0626 |
| 2018/0227106 A1 | 8/2018 | Kim et al. | |
| 2018/0242183 A1* | 8/2018 | Bergström | H04L 5/001 |
| 2019/0349123 A1* | 11/2019 | Virtanen | H04L 1/0026 |
| 2020/0029238 A1* | 1/2020 | Si | H04W 24/10 |

FOREIGN PATENT DOCUMENTS

| | | |
|---|---|---|
| CN | 112789916 A | 5/2021 |
| WO | 2013071488 A1 | 5/2013 |
| WO | 2020029286 A1 | 2/2020 |

OTHER PUBLICATIONS

Mitsubishi Electric, "Discussions on UL multiplexing", R1-1804947, 3GPP TSG RAN WG1 Meeting #92b, Chennai, China, Apr. 16-20, 2018, entire document.

3GPP TS 38.213 V15.2.0 (Jun. 2018); 3rd Generation Partnership Project; Technical Specification Group Radio Access Network; NR; Physical layer procedures for control (Release 15), entire document.

The first Office Action of corresponding European application No. 18929570.2, dated Feb. 2, 2023.

The Notice of Rejection of corresponding Taiwan application No. 108128384, dated Dec. 7, 2022 with machine translation provided by foreign associate.

The international search report of PCT application No. PCT/CN2018/100068, dated May 13, 2019.

Vivo; "Multiplexing data with different transmission durations"; 3GPP TSG RAN WG1 Meeting 90bis, R1-1717502; Prague, CZ, Oct. 9-13, 2017;(Oct. 13, 2017), entire document.

Mitsubishi Electric; "Discussions on UL multiplexing"; 3GPP TSG RAN WG1 Meeting #92b, R1-1804947; Chennai, China, Apr. 16-20, 2018,(Apr. 20, 2018), entire document.

Written Opinion of the International Searching Authority in international application No. PCT/CN2018/100068, dated May 13, 2019 with English translation provided by Google Translate.

The EESR of corresponding European application No. 18929570.2, dated Jul. 23, 2021.

Huawei et al :"Indication of DL transmission burst duration for LAA", 3GPP DRAFT; R1-153786, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015 Aug. 23, 2015(Aug. 23, 2015), XP051001232, entire document.

Shi Junfeng.et al., "Research on standardization of key technologies of 3GPPLAA-LTE physical layer", Developing Strategy, Telecommunications Network Technology No. 12, Dec. 15, 2015, all pages.

The first Office Action and search report of corresponding Chinese application No. 202210837778.2, dated Jul. 13, 2023 with translation provided by applicant's foreign counsel.

The second Office Action of corresponding Chinese application No. 202210837778.2, dated Sep. 20, 2023.

* cited by examiner

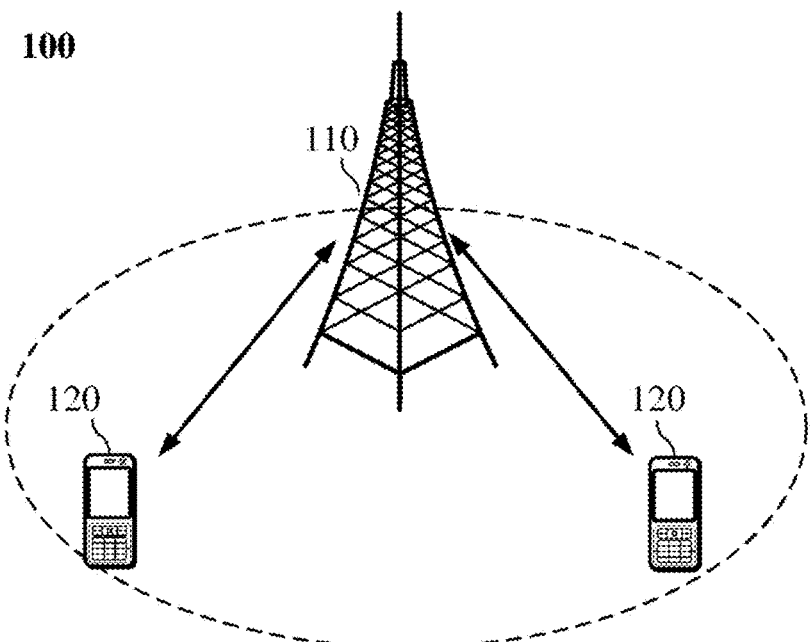
FIG. 1
A terminal receives a first indication signal, and determines, based on the first indication signal, at least one of a time domain, a frequency domain and a code domain of a measurement reference signal whose measurement result is valid ⎯⎯ 201
FIG. 2
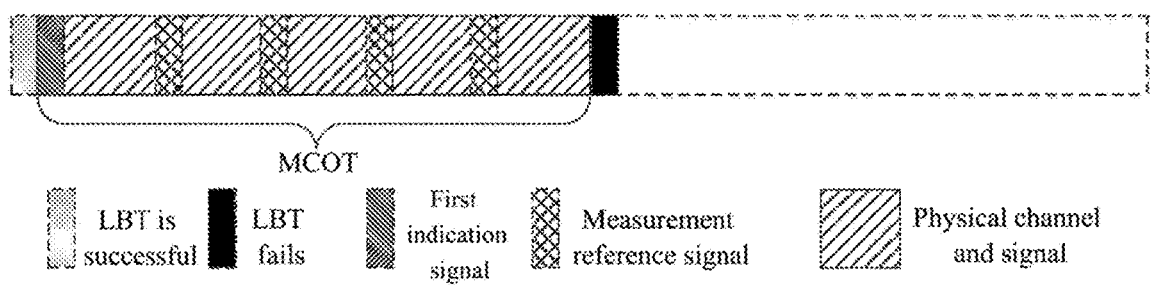
FIG. 3

A base station sends a first indication signal, where the first indication signal is used by a terminal to determine at least one of a time domain, a frequency domain and a code domain of a measurement reference signal whose measurement result is valid ⟋401
FIG. 4
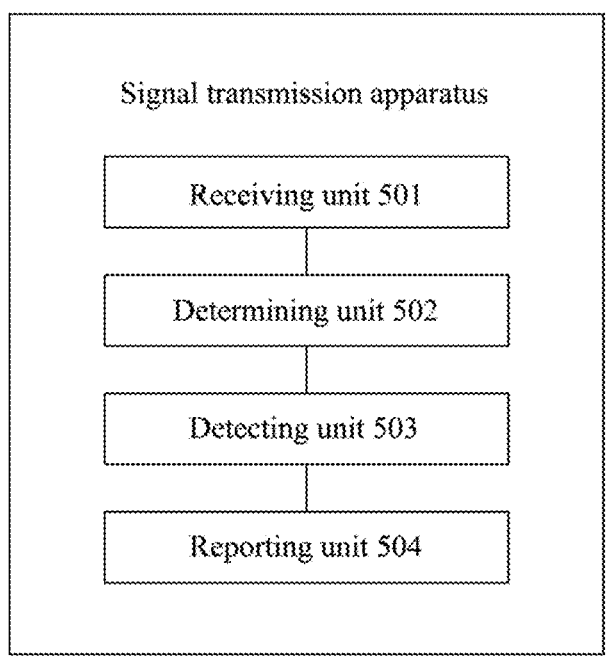
FIG. 5
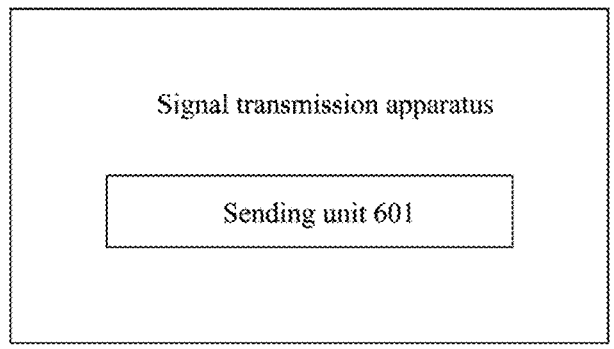
FIG. 6

SIGNAL TRANSMISSION METHOD AND APPARATUS, TERMINAL AND NETWORK DEVICE

CROSS-REFERENCE TO RELATED APPLICATIONS

This application is a continuation of International Application No. PCT/CN2018/100068, filed on Aug. 10, 2018, which is hereby incorporated by reference in its entirety.

TECHNICAL FIELD

Embodiments of the present application relate to the field of mobile communication technologies, and in particular to a signal transmission method and apparatus, a terminal, and a network device.

BACKGROUND

On a licensed spectrum, a terminal measures a measurement reference signal based on a predefined position of the measurement reference signal that is configured. On an unlicensed spectrum, because a downlink channel/signal is occupied by way of listen-before-talk (LBT, Listen-Before-Talk), it is possible that a base station cannot send the measurement reference signal at the predefined position of the measurement reference signal. However, such a case is unknown to the terminal at this time. If the terminal still measures the measurement reference signal based on the predefined position of the measurement reference signal that is configured originally, the measurement result will be inaccurate.

SUMMARY

Embodiments of the present application provide a signal transmission method and apparatus, a terminal, and a network device.

A signal transmission method according to an embodiment of the present application includes:

receiving, by a terminal, a first indication signal, and determining, based on the first indication signal, at least one of a time domain, a frequency domain and a code domain of a measurement reference signal whose measurement result is valid.

A signal transmission method according to an embodiment of the present application includes:

sending, by a base station, a first indication signal, where the first indication signal is used by the terminal to determine at least one of a time domain, a frequency domain, and a code domain of a measurement reference signal whose measurement result is valid.

A signal transmission apparatus according to an embodiment of the present application includes:

a receiving unit, configured to receive a first indication signal;

a determining unit, configured to determine, based on the first indication signal, at least one of a time domain, a frequency domain and a code domain of a measurement reference signal whose measurement result is valid.

A signal transmission apparatus according to an embodiment of the present application includes:

a sending unit, configured to send a first indication signal, where the first indication signal is used by a terminal to determine at least one of a time domain, a frequency domain and a code domain of a measurement reference signal whose measurement result is valid.

A terminal according to an embodiment of the present application includes a processor and a memory. The memory is configured to store a computer program, and the processor is configured to call and execute the computer program stored in the memory to perform the above signal transmission method.

A network device according to an embodiment of the present application includes a processor and a memory. The memory is configured to store a computer program, and the processor is configured to call and execute the computer program stored in the memory to perform the above signal transmission method.

A chip according to an embodiment of the present application is configured to implement the above signal transmission method.

Specifically, the chip includes: a processor, configured to call and execute a computer program from the memory to cause a device installed with the chip to perform the above signal transmission method.

A computer-readable storage medium according to an embodiment of the present application is configured to store a computer program, where the computer program causes a computer to perform the above signal transmission method.

A computer program product according to an embodiment of the present application includes computer program instructions, where the computer program instructions cause a computer to perform the above signal transmission method.

A computer program according to an embodiment of the present application causes a computer to perform the above signal transmission method, when executed on the computer.

Through the above technical solutions, in an unlicensed spectrum system, the first indication signal indicates at least one of the time domain, the frequency domain and the code domain of the measurement reference signal whose measurement result is valid, that is, the first indication signal indicates a channel transmission opportunity or a downlink reception opportunity, so that the terminal measures the measurement reference signal within the duration of the channel transmission opportunity or the downlink reception opportunity, thereby avoiding measurement result errors caused from the inconsistency of the measurement reference signals sent and received between the base station and the terminal.

BRIEF DESCRIPTION OF DRAWINGS

The drawings described here are used to provide a further understanding of the present application and constitute a portion of the present application. Exemplary embodiments of the present application and descriptions thereof are used to explain the present application, but do not constitute an improper limitation to the present application. In the drawings:

FIG. 1 is a schematic diagram of an architecture of a communication system according to an embodiment of the present application;

FIG. 2 is a first schematic flowchart of a signal transmission method according to an embodiment of the present application;

FIG. 3 is a schematic diagram of a measurement reference signal within MCOT time according to an embodiment of the present application;

FIG. 4 is a second schematic flowchart of a signal transmission method according to an embodiment of the present application;

FIG. 5 is a first schematic structural component diagram of a signal transmission apparatus according to an embodiment of the present application;

FIG. 6 is a schematic structural component diagram of a signal transmission apparatus according to an embodiment of the present application;

DESCRIPTION OF EMBODIMENTS

Figure 7:
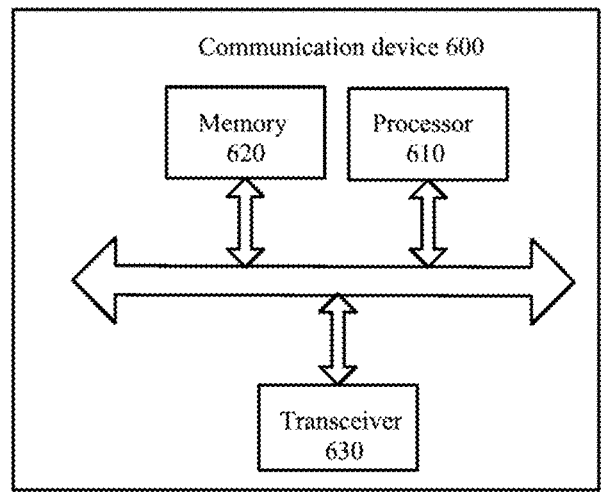
FIG. 7 is a schematic structural diagram of a communication device according to an embodiment of the present application.

In the following, technical solutions of embodiments of the present application will be described in combination with the drawings in embodiments of the present application. Obviously, the described embodiments are parts, but not all, of embodiments of the present application. On the basis of embodiments of the present application, all of other embodiments obtained by the ordinary persons skilled in the art without creative effort shall fall into the protection scope of the present application.

The technical solutions of embodiments of the present application can be applied to various communication systems, such as: a global system of mobile communication (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunication system (Universal Mobile Telecommunication System, UMTS), a worldwide interoperability for microwave access (Worldwide Interoperability for Microwave Access, WiMAX) communication system or a 5G system, etc.

For example, a communication system 100 applied in an embodiment of the present application is shown in FIG. 1. The communication system 100 may include a network device 110, which can be a device in communication with a terminal 120 (or referred to as a communication terminal or a terminal). The network device 110 can provide communication coverage for a specific geographic area, and can communicate with terminals located in the coverage area. Optionally, the network device 110 may be a base station (Base Transceiver Station, BTS) in a GSM system or in a CDMA system, a base station (NodeB, NB) in a WCDMA system, an evolutional base station (Evolutional Node B, eNB or eNodeB) in an LTE system, or a wireless controller in a cloud radio access network (Cloud Radio Access Network, CRAN); or, the network device may be a mobile switching center, a relay station, an access point, an in-vehicle device, a wearable device, a hub, a switch, a bridge, a router, a network side device in the 5G network, or a network device in a public land mobile network (Public Land Mobile Network, PLMN) in future evolution, etc.

The communication system 100 further includes at least one terminal 120 located within the coverage area of the network device 110. The "terminal" used here includes, but is not limited to, connections via a wired line, such as via a public switched telephone network (Public Switched Telephone Network, PSTN), a digital subscriber line (Digital Subscriber Line, DSL), a digital cable, and a direct cable connection; and/or via another data connection/network; and/or via a wireless interface, for instance, for a cellular network, a wireless local area network (Wireless Local Area Network, WLAN), a digital TV network such as a DVB-H network, a satellite network, an AM-FM broadcast transmitter; and/or via a device of another terminal, configured to receive/send communication signals; and/or via an internet of things (Internet of Things, IoT) device. The terminal configured to communicate through a wireless interface may be referred to as a "wireless communication terminal", a "wireless terminal" or a "mobile terminal". Examples of the mobile terminal include, but are not limited to, a satellite or a cellular phone; a personal communications system (Personal Communications System, PCS) terminal that can combine cellular radio phones with data processing, fax, and data communication capabilities; an PDA that can include a radio phone, a pager, an Internet/intranet access, a Web browser, a memo pad, a calendar and/or a global positioning system (Global Positioning System, GPS) receiver; and a conventional laptop and/or palmtop receiver or other electronic devices including a radio telephone transceiver. The terminal can refer to an access terminal, a user equipment (User Equipment, UE), a user unit, a user station, a mobile station, a MS, a remote station, a remote terminal, a mobile device, a user terminal, a terminal, a wireless communication device, a user agent or a user apparatus. The access terminal can be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device with a wireless communication function, a computing device with a wireless communication function, or other processing devices connected to a wireless modem and having a wireless communication function, an in-vehicle device, a wearable device, a terminal in the 5G network, or a terminal in the PLMN in future evolution, etc.

Optionally, a device to device (Device to Device, D2D) communication may be performed between terminals 120.

Optionally, the 5G system or the 5G network may also be referred to as a new radio (New Radio, NR) system or an NR network.

FIG. 1 exemplarily shows one network device and two terminals. Optionally, the communication system 100 may include a plurality of network devices, and the coverage of each network device may include other numbers of terminals, which are not limited in embodiments of the present application.

Optionally, the communication system 100 may further include other network entities, such as a network controller, a mobility management entity, which is not limited in embodiments of the present application.

It should be understood that the device with a communication function in the network/system in embodiments of the present application may be referred to as a communication device. Taking the communication system 100 shown in FIG. 1 as an example, the communication device may include the network device 110 and the terminal 120 with the communication function, and the network device 110 and the terminal 120 may be a specific device described above, which will not be repeated here. The communication device may further include other devices in the communication system 100, for example, other network entities such as a network controller, a mobility management entity and the like, which are not limited in embodiments of the present application.

It should be understood that the terms "system" and "network" are often used interchangeably herein. The expression "and/or" herein is only an association relationship for describing associated objects, and indicates an existence of three types of relationships. For example, the expression "A and/or B" may indicate three cases including existence of A alone, existence of both A and B at the same time, and existence of B alone. In addition, the character "/" herein generally indicates that the relationship between the associated objects before and after the character is the relationship of "or".

To facilitate the understanding of the technical solutions of embodiments of the present application, technologies related to embodiments of the present application are described as follow.

An unlicensed spectrum is a spectrum that is obtained through dividing by countries and regions and that can be used for radio equipment communications. The spectrum is usually considered to be a shared spectrum, that is, if communication devices in different communication systems meet regulatory requirements set by a country or region on the spectrum, the communication devices can use the spectrum without applying for a proprietary spectrum license from a government. In order to allow various communication systems using the unlicensed spectrum for wireless communication to friendly coexist on the spectrum, some countries or regions have stipulated the regulatory requirements that must be met when the unlicensed spectrum is used. For example, in Europe, a communication device follows an LBT principle, that is, it is necessary for the communication device to perform channel sensing before sending signals on an unlicensed spectrum channel. Only when a channel sensing result is that the channel is idle, the communication device can send the signals; if the channel sensing result of the communication device on the unlicensed spectrum channel is that the channel is busy, the communication device cannot send the signals. Furthermore, in order to ensure fairness, during one transmission, a duration of the signal transmission by the communication device using the unlicensed spectrum channel cannot exceed a maximum channel occupation time (MCOT, Maximum Channel Occupation Time).

In the unlicensed spectrum system, a base station needs to perform LBT when sending a downlink channel, and there is a limitation for time to occupy the channel at one time; as a result, the transmission of the downlink channel and signal may be discontinuous. The terminal does not know when the base station starts to occupy the downlink channel for transmission, so the terminal needs to constantly detect the downlink channel, which will result in power consumption of the terminal. In order to reduce the power consumption of the terminal, after the result of the channel sensing performed by the base station is idle, an indication signal is sent to the terminal, to inform the terminal that the base station obtains a downlink transmission opportunity. After receiving the indication, the terminal starts to receive a corresponding downlink channel and signal, such as a PDCCH, a reference signal and the like. Before receiving the indication, the terminal may not detect channels and signals other than the indication signal, or may detect downlink channels and signals including the indication signal using a longer period.

On the other hand, the terminal needs to perform radio resource management (RRM, Radio Resource Management) measurement and radio link monitoring (RLM, Radio Link Monitoring) measurement. By measuring a reference signal received power (RSRP, Reference Signal Received Power), a reference signal received quality (RSRQ, Reference Signal Received Quality) or a signal-to-noise and interference ratio (SINR, Signal-to-noise and Interference Ratio) of a channel state information-reference signal (CSI-RS, Channel State Information-Reference Signal) or a synchronization signal (SS, synchronization signal), mobility management and synchronization and out-of-synchronization judgment are performed. Or, the terminal performs channel state measurement through a configured CSI-RS.

FIG. 2 is a first schematic flowchart of a signal transmission method according to an embodiment of the present application. As shown in FIG. 2, the signal transmission method includes the following steps:

Step 201: a terminal receives a first indication signal, and determines, based on the first indication signal, at least one of a time domain, a frequency domain, and a code domain of a measurement reference signal whose measurement result is valid.

In embodiments of the present application, the terminal may be any device which is capable of communicating through a network, such as a mobile phone, a tablet computer, an in-vehicle terminal, a notebook computer, etc.

In an embodiment of the present application, the terminal receives the first indication signal sent by the base station, and determines, based on the first indication signal, at least one of the time domain, the frequency domain, and the code domain of the measurement reference signal whose measurement result is valid. Here, the base station can be, but is not limited to, a gNB in 5G.

In embodiments of the present application, the first indication signal indicates at least one of the time domain, the frequency domain and the code domain of the measurement reference signal whose measurement result is valid. In this way, the terminal can determine the measurement result of the measurement reference signal detected at which position is a valid measurement result.

In an implementation, the first indication signal directly indicates at least one of a time domain, a frequency domain and a code domain of a measurement reference signal that needs to be detected, where a measurement result corresponding to the measurement reference signal that needs to be detected is a valid measurement result. The terminal determines, based on the first indication signal, at least one of the time domain, the frequency domain, and the code domain of the measurement reference signal that needs to be detected. Further, the terminal performs measurement reference signal detection only at the position of the measurement reference signal whose measurement result is valid.

In an embodiment of the present application, the measurement reference signal includes at least one of a CSI-RS, a TRS, a synchronization signal, and a synchronization signal block.

In an implementation, the first indication signal is a physical layer signal or information carried by a PDCCH. Further, the physical layer signal is a reference signal.

Here, the information carried by the PDCCH may be pre-emption indication (Pre-emption Indication) information. Specifically, the Pre-emption Indication information is carried by the PDCCH, and the Pre-emption Indication information is used to indicate a position of a time-frequency resource occupied by a terminal with ultra-high-reliability and ultra-low-latency communication (URLLC)

service, where the position of the time-frequency resource is located in an area occupied by a physical downlink shared channel (PDSCH) that is scheduled to other terminals before the Pre-emption Indication information is sent, and is used for other terminals to determine time-frequency resources actually occupied by their PDSCHs, thereby further realizing rate matching. In the embodiment of the present application, the Pre-emption Indication information is used to indicate at least one of the time domain, the frequency domain and the code domain of the measurement reference signal whose measurement result is valid.

In embodiments of the present application, considering the LBT principle in the unlicensed spectrum system, it is necessary for the base station to perform the LBT first when sending a downlink channel/signal. After the LBT is successful, the base station obtains a downlink transmission opportunity; and correspondingly, there is a downlink reception opportunity for the terminal side. Based on this, the first indication signal is used to indicate a starting position of the downlink transmission opportunity and/or occupancy time of the downlink transmission opportunity; or, the first indication signal is used to indicate a starting position of the downlink reception opportunity and/or downlink reception time. In the above solution, a time domain position of the measurement reference signal whose measurement result is valid includes a time domain position of the measurement reference signal within the occupancy time of the downlink transmission opportunity or within the downlink reception time.

Referring to FIG. 3, the base station obtains, after successfully performing LBT, a downlink transmission opportunity, and informs the starting position of the downlink transmission opportunity and/or the occupancy time of the downlink transmission opportunity to the terminal through the first indication signal, so that the terminal can determine a time range corresponding to the downlink transmission opportunity, and the terminal measures the measurement reference signal within the time range corresponding to the downlink transmission opportunity, where the time range corresponding to the downlink transmission opportunity cannot exceed the MCOT. An example in which the time range corresponding to one downlink transmission opportunity is the MCOT is shown in FIG. 3. After the end of the MCOT, and before receiving the first indication signal again, the terminal does not measure the measurement reference signal, or not report the measurement result to a higher layer.

Considering that the time domain position of the measurement reference signal is pre-configured on the network side, therefore the terminal detects the measurement reference signal at the time domain position of the measurement reference signal within the occupancy time of the downlink transmission opportunity or within the downlink reception time. Referring to FIG. 3, time of the MCOT includes time domain positions of 4 measurement reference signals, and the terminal will detect the measurement reference signals at the time domain positions of such 4 measurement reference signals.

In an embodiment of the present application, the terminal reports the measurement result of the measurement reference signal at the time domain position to the higher layer. Further, the measurement reference signal is used for RRM measurement, RLM measurement, synchronization, channel state measurement, or time-frequency tracking.

FIG. 4 is a second schematic flowchart of a signal transmission method according to an embodiment of the present application. As shown in FIG. 4, the signal transmission method includes the following steps:

Step 401: a base station sends a first indication signal, where the first indication signal is used by a terminal to determine at least one of a time domain, a frequency domain, and a code domain of a measurement reference signal whose measurement result is valid.

In embodiments of the present application, the base station can be, but is not limited to, a gNB in 5G.

In an embodiment of the present application, the base station sends the first indication signal to the terminal. The terminal may be any device capable of communicating through a network, such as a mobile phone, a tablet computer, an in-vehicle terminal, and a notebook computer.

In an embodiment of the present application, the first indication signal indicates at least one of the time domain, the frequency domain and the code domain of the measurement reference signal whose measurement result is valid. In this way, the terminal can determine the measurement result of the measurement reference signal detected at which position is a valid measurement result.

In an implementation, the first indication signal directly indicates at least one of a time domain, a frequency domain and a code domain of a measurement reference signal that needs to be detected, where a measurement result corresponding to the measurement reference signal that needs to be detected is a valid measurement result. It can be seen that the first indication signal is used by the terminal to determine at least one of the time domain, the frequency domain and the code domain of the measurement reference signal that needs to be detected.

In an embodiment of the present application, the measurement reference signal includes at least one of a CSI-RS, a TRS, a synchronization signal, and a synchronization signal block.

In an implementation, the first indication signal is a physical layer signal or information carried by a PDCCH. Further, the physical layer signal is a reference signal.

Here, the information carried by the PDCCH may be pre-emption indication (Pre-emption Indication) information. Specifically, the Pre-emption Indication information is carried by the PDCCH, and the Pre-emption Indication information is used to indicate a position of a time-frequency resource occupied by a terminal with ultra-high-reliability and ultra-low-latency communication (URLLC) service, where the position of the time-frequency resource is located in an area occupied by a PDSCH that is scheduled to other terminals before the Pre-emption Indication information is sent, and is used for other terminals to determine time-frequency resources actually occupied by their PDSCHs, thereby further realizing rate matching. In the embodiment of the present application, the Pre-emption Indication information is used to indicate at least one of the time domain, the frequency domain and the code domain of the measurement reference signal whose measurement result is valid.

In embodiments of the present application, considering the LBT principle in the unlicensed spectrum system, it is necessary for the base station to perform the LBT first when sending a downlink channel/signal. After the LBT is successful, the base station obtains a downlink transmission opportunity; and correspondingly, there is a downlink reception opportunity for the terminal side. Based on this, the first indication signal is used to indicate a starting position of the downlink transmission opportunity and/or occupancy time of the downlink transmission opportunity; or, the first indication signal is used to indicate a starting position of the downlink reception opportunity and/or downlink reception time. In the above solution, a time domain position of the measurement reference signal whose measurement result is valid includes a time domain position of the measurement reference signal within the occupancy time of the downlink transmission opportunity or within the downlink reception time.

Referring to FIG. 3, the base station obtains, after successfully performing LBT, a downlink transmission opportunity, and informs the starting position of the downlink transmission opportunity and/or the occupancy time of the downlink transmission opportunity to the terminal through the first indication signal, so that the terminal can determine a time range corresponding to the downlink transmission opportunity, and the terminal measures the measurement reference signal within the time range corresponding to the downlink transmission opportunity, where the time range corresponding to the downlink transmission opportunity cannot exceed the MCOT. An example in which the time range corresponding to one downlink transmission opportunity is the MCOT is shown in FIG. 3. After the end of the MCOT, and before receiving the first indication signal again, the terminal does not measure the measurement reference signal, or not report the measurement result to a higher layer.

Considering that the time domain position of the measurement reference signal is pre-configured on the network side, therefore, the terminal detects the measurement reference signal at the time domain position of the measurement reference signal within the occupancy time of the downlink transmission opportunity or within the downlink reception time. Referring to FIG. 3, time of the MCOT includes time domain positions of 4 measurement reference signals, and the terminal will detect the measurement reference signals at the time domain positions of such 4 measurement reference signals.

In an embodiment of the present application, the measurement reference signal is used for RRM measurement, RLM measurement, synchronization, channel state measurement, or time-frequency tracking.

FIG. 5 is a first schematic structural component diagram of a signal transmission apparatus according to an embodiment of the present application. As shown in FIG. 5, the signal transmission apparatus includes:

a receiving unit 501, configured to receive a first indication signal;

a determining unit 502, configured to determine, based on the first indication signal, at least one of a time domain, a frequency domain and a code domain of a measurement reference signal whose measurement result is valid.

In an implementation, the determining unit 502 is configured to determine, based on the first indication signal, at least one of a time domain, a frequency domain and a code domain of a measurement reference signal that needs to be detected, where a measurement result corresponding to the measurement reference signal that needs to be detected is a valid measurement result.

In an implementation, the measurement reference signal includes at least one of a CSI-RS, a TRS, a synchronization signal, and a synchronization signal block.

In an implementation, the first indication signal is a physical layer signal or information carried by a PDCCH.

In an implementation, the physical layer signal is a reference signal.

In an implementation, the first indication signal is used to indicate a starting position of a downlink transmission opportunity and/or occupation time of the downlink transmission opportunity; or, the first indication signal is used to indicate a starting position of a downlink reception opportunity and/or downlink reception time.

In an implementation, a time domain position of the measurement reference signal include a time domain position of the measurement reference signal within the occupancy time of the downlink transmission opportunity or within the downlink reception time.

In an implementation, the apparatus further includes:

a detecting unit 503, configured to detect the measurement reference signal at the time domain position of the measurement reference signal within the occupancy time of the downlink transmission opportunity or within the downlink reception time.

In an implementation, the apparatus further includes:

a reporting unit 504, configured to report the measurement result of the measurement reference signal at the time domain position to a higher layer.

In an implementation, the measurement reference signal is used for RRM measurement, RLM measurement, synchronization, channel state measurement or time-frequency tracking.

It should be understand for those skilled in the art that the description related to the foregoing signal transmission apparatus in embodiments of the present application can be understood with reference to the description related to the signal transmission method in embodiments of the present application.

FIG. 6 is a second schematic structural component diagram of a signal transmission apparatus according to an embodiment of the present application. As shown in FIG. 6, the signal transmission apparatus includes:

a sending unit 601, configured to send a first indication signal, where the first indication signal is used by a terminal to determine at least one of a time domain, a frequency domain and a code domain of a measurement reference signal whose measurement result is valid.

In an implementation, the first indication signal is used by the terminal to determine at least one of a time domain, a frequency domain and a code domain of a measurement reference signal that needs to be detected, where a measurement result corresponding to the measurement reference signal that needs to be detected is a valid measurement result.

In an implementation, the measurement reference signal includes at least one of a CSI-RS, a TRS, a synchronization signal, and a synchronization signal block.

In an implementation, the first indication signal is a physical layer signal or information carried by a PDCCH.

In an implementation, the physical layer signal is a reference signal.

In an implementation, the first indication signal is used to indicate a starting position of a downlink transmission opportunity and/or occupation time of the downlink transmission opportunity; or, the first indication signal is used to indicate a starting position of a downlink reception opportunity and/or downlink reception time.

In an implementation, a time domain position of the measurement reference signal includes a time domain position of the measurement reference signal within the occupancy time of the downlink transmission opportunity or within the downlink reception time.

In an implementation, the measurement reference signal is used for RRM measurement, RLM measurement, synchronization, channel state measurement or time-frequency tracking.

It should be understand for those skilled in the art that the description related to the foregoing signal transmission apparatus in embodiments of the present application can be understood with reference to the description related to the signal transmission method in embodiments of the present application.

FIG. 7 is a schematic structural diagram of a communication device 600 according to an embodiment of the present application. The communication device may be a terminal or a network device. The communication device 600 shown in FIG. 7 includes a processor 610, which can call and execute a computer program from a memory to implement the methods in embodiments of the present application.

Optionally, as shown in FIG. 7, the communication device 600 can further include a memory 620. The processor 610 can call and execute a computer program from the memory 620 to implement the methods in embodiments of the present application.

The memory 620 may be a separate component independent of the processor 610, or may be integrated into the processor 610.

Optionally, as shown in FIG. 7, the communication device 600 can further include a transceiver 630, and the processor 610 can control the transceiver 630 to communicate with other devices. Specifically, the transceiver can send information or data to other devices, or receive information or data sent by other devices.

The transceiver 630 may include a transmitter and a receiver. The transceiver 630 may further include an antenna, and the number of the antenna may be one or more.

Optionally, the communication device 600 may specifically be a network device according to embodiments of the present application, and the communication device 600 may implement corresponding processes implemented by the network device in respective methods of the embodiments of the present application. For brevity, the details are not repeated here.

Optionally, the communication device 600 may specifically be a mobile terminal/terminal according to embodiments of the present application, and the communication device 600 may implement corresponding processes implemented by the mobile terminal/terminal in respective methods of the embodiments of the present application. For brevity, the details are not repeated here.

Figure 8:
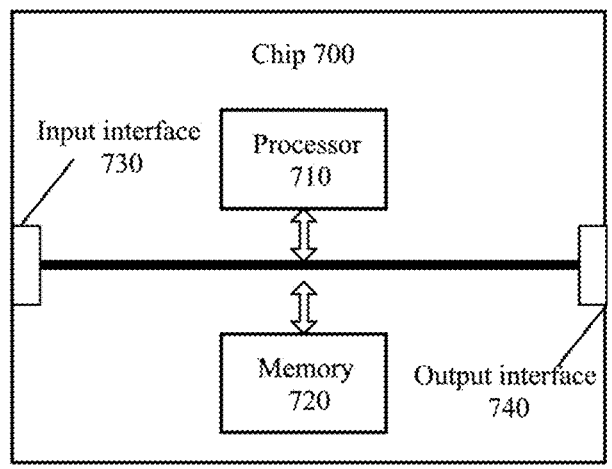
FIG. 8 is a schematic structural diagram of a chip according to an embodiment of the present application.

FIG. 8 is a schematic structural diagram of a chip according to an embodiment of the present application. The chip 700 shown in FIG. 8 includes a processor 710, which can call and execute a computer program from a memory to implement the methods in embodiments of the present application.

Optionally, as shown in FIG. 8, the chip 700 can further include a memory 720. The processor 710 can call and execute a computer program from the memory 720 to implement the methods in embodiments of the present application.

The memory 720 may be a separate component independent of the processor 710, or may be integrated into the processor 710.

Optionally, the chip 700 can further include an input interface 730. The processor 710 can control the input interface 730 to communicate with other devices or chips, and specifically to obtain information or data sent by other devices or chips.

Optionally, the chip 700 can further include an output interface 740. The processor 710 can control the output interface 740 to communicate with other devices or chips, and specifically to output information or data to other devices or chips.

Optionally, the chip can be applied to the network device in embodiments of the present application, and the chip can implement corresponding processes implemented by the network device in respective methods of the embodiments of the present application. For brevity, the details are not repeated here.

Optionally, the chip can be applied to the mobile terminal/terminal in embodiments of the present application, and the chip can implement corresponding processes implemented by the mobile terminal/terminal in respective methods of the embodiments of the present application. For brevity, the details are not repeated here.

It should be understood that the chip described in embodiments of the present application may also be referred to as a system-level chip, a system-on-chip, a chip system, an SoC chip or the like.

Figure 9:
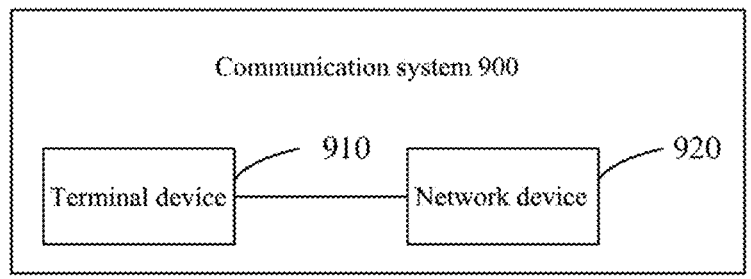
FIG. 9 is a schematic block diagram of a communication system according to an embodiment of the present application.

FIG. 9 is a schematic block diagram of a communication system 900 according to an embodiment of the present application. As shown in FIG. 9, the communication system 900 includes a terminal 910 and a network device 920.

The terminal 910 can be configured to implement corresponding functions implemented by the terminal in the foregoing methods, and the network device 920 can be configured to implement corresponding functions implemented by the network device in the foregoing methods. For brevity, the details are not repeated herein.

It should be understood that the processor according to embodiments of the present application may be an integrated circuit chip with the capability of processing signals. In the implementation process, the steps of the foregoing method embodiments can be completed by an integrated logic circuit in hardware of the processor or by instructions in the form of software. The above processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gates or transistor logic devices, discrete hardware components, which can implement or perform the methods, steps, and logical block diagrams disclosed in the embodiments of the present application. The general-purpose processor may be a microprocessor, or the processor may also be any conventional processor or the like. The steps of the methods disclosed in combination with embodiments of the present application can be directly embodied as being executed and completed by a hardware decoding processor, or being executed and completed by a combination of hardware and software modules in a decoding processor. The software modules can be located in a storage medium which is mature in the art, such as a random access memory, a flash memory, a read-only memory, a programmable read-only memory, an electrically erasable programmable memory, a register, etc. The storage medium is located in a memory, and the processor reads information in the memory and completes the steps of the above methods in combination with hardware thereof.

It can be understood that the memory in embodiments of the present application may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (Random Access Memory, RAM), which is used as an external cache. By way of exemplary but not restrictive description, various RAMS are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synch link dynamic random access memory (Synch link DRAM, SLDRAM)) or a direct rambus random access memory (Direct Rambus RAM, DR RAM). It should be noted that the memories of the systems and methods described herein are intended to include, but are not limited to, these and any other suitable types of memories.

It should be understood that the above memories are exemplary but not restrictive. For example, the memory in embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (Synch link DRAM, SLDRAM)) or a direct rambus random access memory (Direct Rambus RAM, DR RAM), etc. That is to say, the memories in embodiments of the present application are intended to include, but not limited to, these and any other suitable types of memories.

An embodiment of the present application further provides a computer-readable storage medium, configured to store a computer program.

Optionally, the computer-readable storage medium can be applied to the network device in embodiments of the present application, and the computer program causes a computer to perform corresponding processes implemented by the network device in respective methods of the embodiments of the present application. For brevity, the details are not repeated herein.

Optionally, the computer-readable storage medium can be applied to the mobile terminal/terminal in embodiments of the present application, and the computer program causes the computer to perform corresponding processes implemented by the mobile terminal/terminal in respective methods of the embodiments of the present application. For brevity, the details are not repeated herein.

An embodiment of the present application further provides a computer program product, including computer program instructions.

Optionally, the computer program product can be applied to the network device in embodiments of the present application, and the computer program instructions cause a computer to perform corresponding processes implemented by the network device in respective methods of the embodiments of the present application. For brevity, the details are not repeated herein.

Optionally, the computer program product can be applied to the mobile terminal/terminal in embodiments of the present application, and the computer program instructions cause the computer to perform corresponding processes implemented by the mobile terminal/terminal in respective methods of the embodiments of the present application. For brevity, the details are not repeated herein.

An embodiment of the present application further provides a computer program.

Optionally, the computer program can be applied to the network device in embodiments of the present application. The computer program causes, when executed on a computer, the computer to perform corresponding processes implemented by the network device in respective methods of the embodiments of the present application. For brevity, the details are not repeated herein.

Optionally, the computer program can be applied to the mobile terminal/terminal in embodiments of the present application. The computer program causes, when executed on the computer, the computer to perform corresponding processes implemented by the mobile terminal/terminal in respective methods of the embodiments of the present application. For brevity, the details are not repeated herein.

Those ordinary persons skilled in the art may realize that the units and algorithm steps of the examples described in combination with embodiments disclosed herein can be implemented by electronic hardware, or a combination of computer software and electronic hardware. Whether these functions are performed by hardware or software depends on specific applications and design constraints for the technical solution. Those skilled persons can use different methods to implement the described functions for each specific application, but such implementations should not be considered beyond the scope of the present application.

Those skilled in the art can clearly understand that, for convenience and concise description, the corresponding processes in the foregoing method embodiments may be referred to for the specific operation processes of the system, apparatus, and unit described above, and the details are not repeated here.

It should be understood that, the system, the apparatus and the method disclosed in the several embodiments provided in the present application may be implemented in other ways. For example, the apparatus embodiments described above are merely illustrative. For example, the division of the units is merely a logical function division. There may be other divisions in actual implementation, for example, a plurality of units or components may be combined, or may be integrated into another system, or some features can be ignored or not implemented. In addition, the displayed or discussed mutual coupling or direct coupling or communication connection may be an indirect coupling or communication connection through some interfaces, apparatuses or units, and may be in electrical, mechanical or other forms.

Units described as separate components may or may not be physically separated, and a component displayed as a unit may or may not be a physical unit, that is, it may be located in one place, or may be distributed on a plurality of network units. Some or all of the units may be selected according to actual requirements so as to achieve objectives of solutions of the embodiments.

In addition, the various functional units in the various embodiments of the present application may be integrated into one processing unit, or each unit may physically exist alone, or two or more units may be integrated into one unit.

If the functions are implemented in the form of software functional units and sold or used as an independent product, they can be stored in a computer readable storage medium. Based on this understanding, the essence, or the portion contributing to the prior art, or part of the technical solutions of the present application can be embodied in the form of a software product. The computer software product is stored in a storage medium, including several instructions used to cause a computer device (which may be a personal computer, a server, or a network device, etc.) to perform all or parts of the steps of the methods described in the various embodiments of the present application. The aforementioned storage medium includes various media that can store program codes, such as a U disk, a mobile hard disk, a read-only memory (Read-Only Memory, ROM), a random access memory (Random Access Memory, RAM), a magnetic disk or an optical disk.

The above description is only specific implementations of the present application, but the protection scope of the present application is not limited thereto. Changes or replacements easily thought of by any person skilled in the art within the technical scope disclosed in the present application should be contained in the protection scope of the present application. Therefore, the protection scope of the present application shall be subject to the protection scope of the claims.

What is claimed is:

1. A signal transmission method, wherein the method comprises:
   determining, by a terminal, a plurality of predefined positions of a measurement reference signal, wherein the plurality of predefined positions of the measurement reference signal is configured by a base station for the terminal, and comprise a time domain position;
   receiving, by the terminal, a first indication signal;
   determining, based on the first indication signal, at least one of a time domain, a frequency domain and a code domain of the measurement reference signal whose measurement result is valid so as to obtain one or more positions where the measurement result of a detected measurement reference signal is valid among the plurality of predefined positions.

2. The method according to claim 1, wherein the determining, based on the first indication signal, at least one of the time domain, the frequency domain and the code domain of the measurement reference signal whose measurement result is valid comprises:
   determining, based on the first indication signal, at least one of a time domain, a frequency domain and a code domain of a measurement reference signal that needs to be detected, wherein a measurement result corresponding to the measurement reference signal that needs to be detected is [[a]]the valid measurement result.

3. The method according to claim 1, wherein the measurement reference signal comprises at least one of a channel state information reference signal (CSI-RS), a tracking reference signal (TRS), a synchronization signal, and a synchronization signal block;
   the first indication signal is a physical layer signal or information carried by a physical downlink control channel (PDCCH);
   the physical layer signal is a reference signal.

4. The method according to claim 1, wherein,
   the first indication signal is used to indicate a starting position of a downlink transmission opportunity and/or occupancy time of the downlink transmission opportunity; or,
   the first indication signal is used to indicate a starting position of a downlink reception opportunity and/or downlink reception time.

5. The method according to claim 4, wherein the time domain position of the measurement reference signal comprises the time domain position of the measurement reference signal within the occupancy time of the downlink transmission opportunity or within the downlink reception time;
   the method further comprises:
   detecting, by the terminal, the measurement reference signal at the time domain position of the measurement reference signal within the occupancy time of the downlink transmission opportunity or within the downlink reception time;
   reporting, by the terminal, the measurement result of the measurement reference signal at the time domain position to a higher layer.

6. The method according to claim 1, wherein the measurement reference signal is used for radio resource management (RRM) measurement, radio link monitoring (RLM) measurement, synchronization, channel state measurement, or time-frequency tracking.

7. A signal transmission method, wherein the method comprises:
   configuring, by a base station, a plurality of predefined positions of a measurement reference signal for a terminal, wherein the predefined positions comprise a time domain position;
   sending, by the base station, a first indication signal, wherein the first indication signal is used by a terminal to determine at least one of a time domain, a frequency domain, and a code domain of the measurement reference signal whose measurement result is valid so as to obtain one or more positions where the measurement result of a detected measurement reference signal is valid among the plurality of predefined positions.

8. The method according to claim 7, wherein the first indication signal is used by the terminal to determine at least one of a time domain, a frequency domain and a code domain of a measurement reference signal that needs to be detected, wherein a measurement result corresponding to the measurement reference signal that needs to be detected is the valid measurement result.

9. The method according to claim 7, wherein the measurement reference signal comprises at least one of a channel state information reference signal (CSI-RS), a tracking reference signal (TRS), a synchronization signal, and a synchronization signal block;
   the first indication signal is a physical layer signal or information carried by a (PDCCH);
   the physical layer signal is a reference signal.

10. The method according to claim 7, wherein,
    the first indication signal is used to indicate a starting position of a downlink transmission opportunity and/or occupancy time of the downlink transmission opportunity; or,
    the first indication signal is used to indicate a starting position of a downlink reception opportunity and/or downlink reception time.

11. The method according to claim 10, wherein the time domain position of the measurement reference signal comprises the time domain position of the measurement reference signal within the occupancy time of the downlink transmission opportunity or within the downlink reception time.

12. The method according to claim 7, wherein the measurement reference signal is used for radio resource management (RRM) measurement, radio link monitoring (RLM) measurement, synchronization, channel state measurement, or time-frequency tracking.

13. A signal transmission apparatus, wherein the apparatus comprises:
    a processor and a memory, wherein the memory is configured to store a computer program, and the processor is configured to call and execute the computer program stored in the memory to:

determine a plurality of predefined positions of a measurement reference signal, wherein the plurality of predefined positions of the measurement reference signal is configured by a base station for the apparatus, and comprise a time domain position;

receive a first indication signal;

determine, based on the first indication signal, at least one of a time domain, a frequency domain and a code domain of the measurement reference signal whose measurement result is valid so as to obtain one or more positions where the measurement result of a detected measurement reference signal is valid among the plurality of predefined positions.

14. The apparatus according to claim 13, wherein the processor is configured to determine, based on the first indication signal, at least one of a time domain, a frequency domain and a code domain of a measurement reference signal that needs to be detected, wherein a measurement result corresponding to the measurement reference signal that needs to be detected is the valid measurement result.

15. The apparatus according to claim 13, wherein the measurement reference signal comprises at least one of a channel state information reference signal (CSI-RS), a tracking reference signal (TRS), a synchronization signal, and a synchronization signal block;

the first indication signal is a physical layer signal or information carried by a (PDCCH);

the physical layer signal is a reference signal.

16. The apparatus according to claim 13, wherein, the first indication signal is used to indicate a starting position of a downlink transmission opportunity and/or occupancy time of the downlink transmission opportunity; or, the first indication signal is used to indicate a starting position of a downlink reception opportunity and/or downlink reception time.

17. The apparatus according to claim 16, wherein the time domain position of the measurement reference signal comprises the time domain position of the measurement reference signal within the occupancy time of the downlink transmission opportunity or within the downlink reception time;

the processor is further configured to:

detect the measurement reference signal at the time domain position of the measurement reference signal within the occupancy time of the downlink transmission opportunity or within the downlink reception time;

report the measurement result of the measurement reference signal at the time domain position to a higher layer.

18. The apparatus according to claim 13, wherein the measurement reference signal is used for radio resource management (RRM) measurement, radio link monitoring (RLM) measurement, synchronization, channel state measurement, or time-frequency tracking.

19. A signal transmission apparatus, wherein the apparatus comprises:

a processor and a memory, wherein the memory is configured to store a computer program, and the processor is configured to call and execute the computer program stored in the memory to:

configure a plurality of predefined positions of a measurement reference signal for a terminal, wherein the predefined positions comprise a time domain position;

send a first indication signal, wherein the first indication signal is used by a terminal to determine at least one of a time domain, a frequency domain, and a code domain of the measurement reference signal whose measurement result is valid so as to obtain one or more positions where the measurement result of a detected measurement reference signal is valid among the plurality of predefined positions.

20. The apparatus according to claim 19, wherein the first indication signal is used by the terminal to determine at least one of a time domain, a frequency domain and a code domain of a measurement reference signal that needs to be detected, wherein a measurement result corresponding to the measurement reference signal that needs to be detected is the valid measurement result.

21. The apparatus according to claim 19, wherein the measurement reference signal comprises at least one of a channel state information reference signal (CSI-RS), a tracking reference signal (TRS), a synchronization signal, and a synchronization signal block;

the first indication signal is a physical layer signal or information carried by a (PDCCH);

the physical layer signal is a reference signal.

22. The apparatus according to claim 19, wherein, the first indication signal is used to indicate a starting position of a downlink transmission opportunity and/or occupancy time of the downlink transmission opportunity; or, the first indication signal is used to indicate a starting position of a downlink reception opportunity and/or downlink reception time.

23. The apparatus according to claim 22, wherein a time domain position of the measurement reference signal comprises a time domain position of the measurement reference signal within the occupancy time of the downlink transmission opportunity or within the downlink reception time.

24. The apparatus according to claim 19, wherein the measurement reference signal is used for radio resource management (RRM) measurement, radio link monitoring (RLM) measurement, synchronization, channel state measurement, or time-frequency tracking.

* * * * *